US000001863H

United States Statutory Invention Registration [19]

[11] Reg. Number: H1,863

Siemers et al.

[45] Published: Oct. 3, 2000

[54] COMPOSITE FABRICATION PROCESS TO ACHIEVE FLATNESS

[75] Inventors: Paul Alfred Siemers, Clifton Park, N.Y.; Rita Janelle Thurston, Arlington Heights, Ill.; Joseph Jay Jackson, Topsfield, Mass.

[73] Assignee: General Electric Company, Niskayuna, N.Y.

[21] Appl. No.: 08/901,753

[22] Filed: Jul. 28, 1997

Related U.S. Application Data

[60] Continuation of application No. 08/522,907, Sep. 1, 1995, abandoned, which is a division of application No. 08/403,017, Mar. 13, 1995, abandoned.

[51] Int. Cl.[7] ..... B23P 25/00

[52] U.S. Cl. ..... 29/458

[56] References Cited

U.S. PATENT DOCUMENTS

| | | | |
|---|---|---|---|
| 4,616,393 | 10/1986 | Beauregard et al. | 29/423 |
| 4,831,708 | 5/1989 | Yoshiwara et al. | 29/423 |
| 5,017,438 | 5/1991 | Siemers et al. | 428/614 |

*Primary Examiner*—Charles T. Jordan
*Assistant Examiner*—Meena Chelliah
*Attorney, Agent, or Firm*—Ernest G. Cusick; Noreen C. Johnson

[57] ABSTRACT

A method and a HIP can structure for hot isostatically pressed (HIP) production of flat sheet metal matrix composites having a dimension greater than about 4×5 inches. The HIP can is constructed so that most of the expensive components are reusable for further processing of other composites. The side walls of the HIP can have reduced thickness relative to the top and bottom walls and the can has a reinforced centerpiece between the two composites used in the example. Molybdenum foils are utilized to separate the composites from the stiffening structure so that when the HIP can is opened by breaking the weld at one of its wings, the components of the can and the composites come apart so that the most expensive structural members of the HIP can be reused.

7 Claims, 2 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

COMPOSITE FABRICATION PROCESS TO ACHIEVE FLATNESS

This application is a Continuation of application Ser. No. 08/522,907 filed Sep. 1, 1995, Abandoned on Jul. 28, 1997 which is a division, of application Ser. No. 08/403,017, filed Mar. 13, 1995, Abandoned on Feb. 4, 1997.

BACKGROUND OF THE INVENTION

The present invention relates to the formation of large reinforcing mat structures. More particularly, it relates to the formation of filament reinforcement mat structures having relatively large dimensions and having a relatively large number of strands of filament reinforcement on the order of about 100 or more per inch.

Methods for the formation of filament reinforced structures are disclosed in U.S. patents assigned to the same assignee as the subject application. The preparation of titanium alloy base foils, sheets, and similar articles and of reinforced structures in which silicon carbide fibers are embedded in a titanium base alloy are described in U.S. Pat. Nos. 4,775,547; 4,782,884; 4,786,566; 4,805,294; 4,805,333; and 4,838,337; assigned to the same assignee as the subject application. The texts of these patents are expressly incorporated herein by reference.

Preparation of composites as described in these patents is the subject of intense study inasmuch as the composites have very high strength properties in relation to their weight. One of the properties which is particularly desirable is the high tensile properties imparted to the structures by the high tensile properties of the silicon carbide fibers or filaments. The tensile properties of the structures are related to the rule of mixtures. According to this rule the proportion of the property, such as the tensile property, which is attributed to the filament, as contrasted with the matrix, is determined by the volume percent of the filament present in the structure and by the tensile strength of the filament itself. Similarly, the proportion of the same tensile property which is attributed to the matrix is determined by the volume percent of the matrix present in the structure and the tensile strength of the matrix itself. To achieve high tensile properties in composite structures it is preferred to have a relatively high volume fraction of the filament reinforcement.

Prior to the development of the processes described in the above-referenced patents, such structures were prepared by sandwiching the reinforcing filaments between foils of titanium base alloy and by pressing the stacks of alternate layers of alloy and reinforcing filament until a composite structure was formed.

The structures taught in the above-referenced patents and the methods by which they are formed, generally improved over the earlier practice of forming sandwiches of matrix and reinforcing filament by compression.

Later it was found that while the structures prepared as described in the above-referenced patents have properties which are a great improvement over earlier structures, the attainment of the potentially very high ultimate tensile strength of these structures did not quite attain the tensile strength values theoretically possible. The testing of composites formed according to the methods taught in the above patents has demonstrated that, although modulus values are generally in good agreement with the rule of mixtures predictions, the ultimate tensile strength is usually much lower than predicted by the underlying properties of the individual ingredients to the composite. A number of applications have been filed which are directed toward overcoming the problem of lower than expected tensile properties. These include U.S. Pat. No. 4,978,585, issued Dec. 18, 1990; U.S. Pat. No. 5,017,438, issued May 21, 1991; U.S. Pat. No. 5,201,939, issued Apr. 13, 1993; and 5,045,407, issued Sep. 3, 1991. The texts of these applications are expressly incorporated herein by reference.

As this technology develops and the fiber reinforced composite structures are themselves improved as by some of the commonly owned patented processes referred to above, the structures are being applied to more end uses and specific requirements for the structures which permit their incorporation in such end uses have become more demanding.

One problem which has surfaced relates to producing flat configuration of composites having larger lateral dimensions. Thus, there is a need for a method and apparatus for producing composite plates having longer lateral dimensions greater than 4×5 inches while maintaining composite flatness.

SUMMARY OF THE INVENTION

In one of its broader aspects, objects of the present invention can be achieved by providing a plurality of mats of aligned reinforcing fibers and plasma sprayed depositing a matrix metal, such as, for example, titanium base metal on each of the mats to form a plurality of reinforced monotape structures. Next, a slab of a metal having a high melting point is shaped to provide two opposite flat parallel surfaces. A set of monotape structures is assembled and placed on one side of the metal slab, and the second set of monotapes essentially of equal thickness to the first set is assembled and placed on the opposite side of the metal slab. The assembled slab and sets of monotapes is enclosed within a hot isostatically press (HIP) can having a generally symmetrical construction including a top, a bottom and two side walls and having a shape closely conforming to that of the slab and assembled monotapes. The HIP can is evacuated and sealed and the sealed structure is then hot isostatically pressed (HIP'd) to cause consolidation of each of the sets of monotapes on the opposite sides of the slab. Following the HIPing, the HIP can is removed and the essentially flat consolidated reinforced composite structures are separated from the slab.

In another aspect of the invention, the two side walls are thicker than the top and bottom walls.

In still another aspect of the invention, the side walls are about twice as thick as the top and bottom walls.

In yet another aspect of the invention, the formed metal matrix composite structure is flat to within about 0.010 inches at a distance of about 0.25 inches from the edge.

In another aspect of the invention, the formed metal matrix composite structure is flat within about 0.020 inches with the largest deviation being about 0.5 inches at the edge.

In still another aspect of the invention, the formed metal matrix composite structure is flat to within about 0.01 inches at distances greater than 0.5 inches from the edge.

Accordingly, an object of the present invention is to provide a method and apparatus for producing a flat composite configuration for mats having large lateral dimensions.

Another object of the present invention is to provide an improved flat composite configuration for mats having large lateral dimensions having higher tensile strengths than those produced by prior methods.

A further object of the present invention is to provide a HIP can for use with the new method.

A still further object of the present invention is to provide a HIP can for use with the new method which has components that can be reused to form additional composites.

Other objects and advantages of the invention will be apparent from the following description, the accompanying drawings and the appended claims.

BRIEF DESCRIPTION OF THE DRAWINGS

FIG. I is a perspective view of a representative hot isostatically press (HIP) can used in the composite fabrication process to achieve flatness;

FIGURE II is a cross-section view of the HIP can showing the details of both the HIP can and the composites; and FIGURE III is an enlarged portion showing details of the HIP can construction and the composite structure.

DETAILED DESCRIPTION OF THE INVENTION

Figure 1:
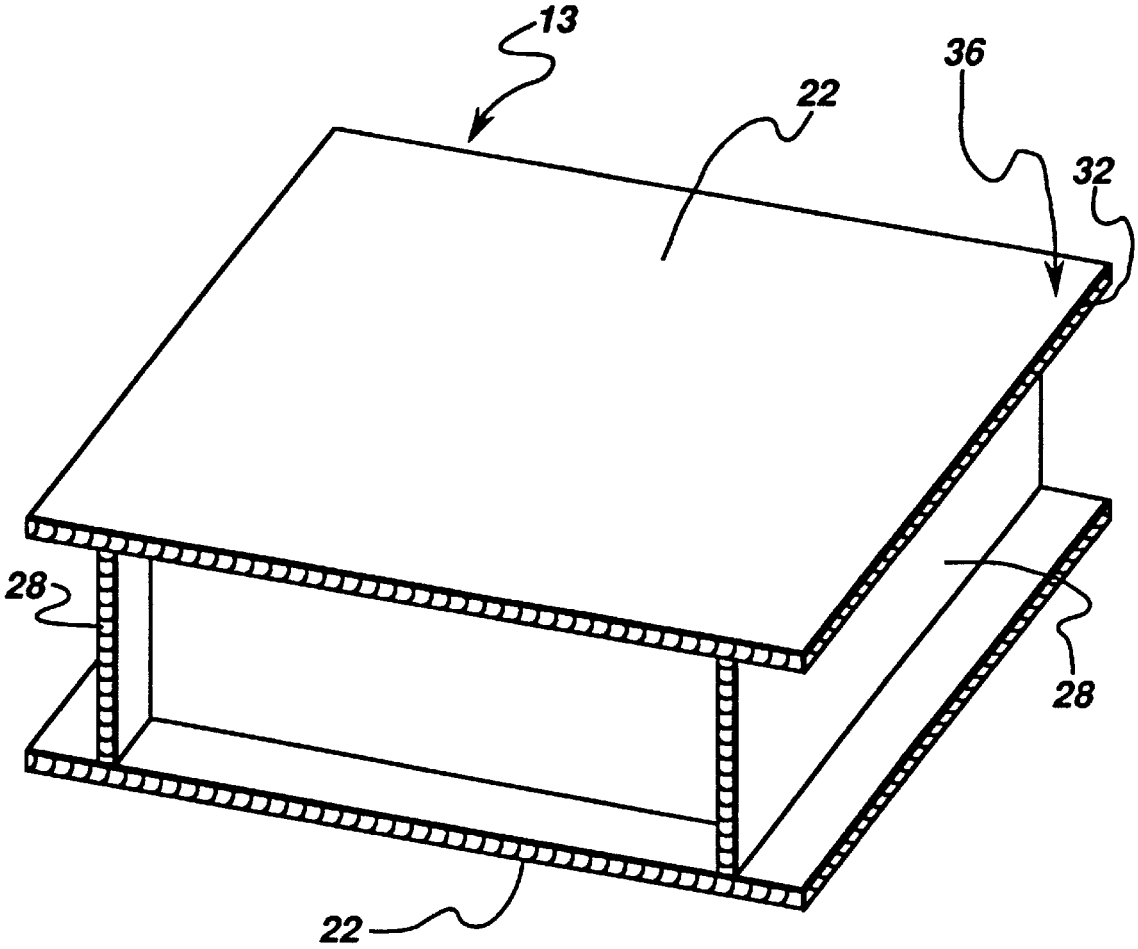

Fiber reinforced composite structures are being considered for use in a variety of aircraft applications because of their light weight, high strength, and high stiffness. For composites which are to be employed in aircraft engine applications, we deem it preferable that the composite be embedded in a monolithic titanium alloy in order to gain protection against oxidative attack of the composite as well as to divide ease of machining to a final shape and ease of attachment to other engine components. For the applications of such composites which require that a composite plate or bar be embedded in a monolithic alloy component, the flatness of the composite is deemed to be important to the application, particularly when the component has large dimensions.

It is known that fiber reinforced composite structures can be prepared by HIPing either a plurality of monotape elements or by HIPing an assembly of foil-fiber-foil assemblies. To accomplish such HIPing, the structures to be HIP'd are normally enclosed within a HIPing can by conventional practice and the HIPing can is evacuated and then subjected to heat and pressure for a time which permits solid tape bonding of the component elements.

However, it has been the finding of those practicing these conventional methods that the densified composite plates formed by such processes have a slight bow sufficient to interfere with their use for the intended purpose, for example, to stiffen and reinforce a structure in which the plate is embedded within a monolithic alloy as described above.

One way in which it has been found possible to obtain relatively flat fiber reinforced composite plates is to employ hot pressing to accomplish the consolidation of an assembly of monotapes or of foil-fiber-foil layups. Hot pressing differs from HIPing in that hydraulic cylinders generate the densifying pressure which acts in one direction through a set of dyes. The dyes maintain the flatness of the composite during densification. By contrast, in hot isostatic pressing, the densifying forces are generated by high gas pressures enclosed in a HIP vessel which apply force isostatically in all directions. It has been found that the faces of the plastically deforming HIP can do not maintain an adequate degree of composite flatness.

One problem with the hot pressing technique is that, although the hot pressing will generally yield flat composites, the hot pressing process is not easily scaled to larger plates. Titanium alloy composites are densified by heating them to about 900 to about 1,000° C. for about one to about three hours at about 15,000 psi pressure. A plate having dimensions of 4×5 inches would require a 150 ton hot press. Further, a composite plate having dimensions of 6×24 inches would require a press of greater than one million tons, which would be prohibitively expensive, if one were available.

Although heretofore the HIP processing of such composites has yielded bowed products, it is recognized that the HIP units are available which have a 60 inch diameter and an 80 inch long hot zone. Accordingly, for larger panels, HIPing is a feasible approach for densifying composites employing currently available commercial apparatus. However, absent from the currently available HIP process is a means for maintaining sufficient flatness of the composite products which are produced thereby.

We have discovered that metal matrix composite panels can be HIP consolidated to full density with acceptable flatness. In order to accomplish this, we have found that both the composite and the HIP can must be balanced about their central axes to prevent bending moments from developing as a result of differential thermal expansion. Further, we have found that it is beneficial to stiffen the HIP can with a large slab of heat resistant metal which is placed symmetrically in the center of the can. The slab of metal increases the section modulus of the can and has been found to prevent excessive bowing which otherwise normally results from the HIPing operation.

Over the course of several years, we have made numerous observations regarding deposit flatness with respect to HIP can design. The beneficial results obtainable through the use of the present invention may be explained with greater clarity by reference to the accompanying examples.

EXAMPLE I

One monotape having aligned fiber reinforcement was prepared by RF plasma spray processing. The monotape was formed on a rotatable drum in an evacuated chamber in a conventional manner generally as described in issued U.S. Patents, such as, for example, U. S. Pat. No. 4,786,566.

A fiberless foil of titanium base alloy Ti-6242 (Ti-6Al-2Sn-4Zr-2Mo, composition by weight) was similarly prepared by RF plasma spray deposit of powder of the metal onto a drum shaped receiving surface. The monotape was cut into 4×5 inch pieces and the fiberless foil was cut into four pieces having essentially the same dimensions. A composite was fabricated by stacking the four pieces of monotape. The stacking was done so that the smooth side of each monotape touched the rough side of the adjacent monotape and a piece of fiberless foil was placed on each outer surface.

A second composite was fabricated by placing the fiberless foil in the center of the layup of four monotapes as described above. In this case, two monotapes were stacked on each side of the fiberless foil with their smooth sides facing toward the center of the layup. Each of the composite layups were sealed in mild steel HIP cans having wall thicknesses of 0.062 inches. A 0.001 inch thick molybdenum foil was inserted between the mild steel and the composite to prevent interdiffusion of the steel and titanium alloy composite.

The two evacuated and sealed HIP cans were then HIP'd in conventional high pressure gas HIPing apparatus for three hours at 900° C. and 15 ksi HIPing pressure.

After HIPing, steel cans were removed by dissolution in a nitric acid solution. Examination of the two composite panels revealed that the panel with the fiberless foil in the center was flatter than the first panel. This observation has been made on several composite panels of similar character and led us to the conclusion that a balanced composite layup is preferable in order to obtain greater flatness in the HIP'd composite.

EXAMPLE II

A composite layup identical to the "balanced" (the second) layup of Example I was fabricated. The layup was first sealed in a HIP can according to the procedures described in Example I with the exception that one wall of HIP can was 0.25 inches thick instead of 0.062 inches thick.

The intent of this test was to determine if a "stiff" wall would help maintain can flatness during HIPing. After HIPing at the same time temperature and pressure as was used in Example I, the resulting can was found to be grossly bent in the direction of the thin wall of the can. It appeared that the preferential deformation of the thin wall during HIPing created a bending moment on the thick wall thus causing its deformation during HIPing.

From this test, it was concluded that it is quite important to have a balanced HIP can as well as a balanced composite layup. It was also determined that a thin wall of a HIP can will deform preferentially over a thick wall under the same HIPing conditions. Accordingly, from the two structures formed in Example I and the one structure formed in Example II, it was concluded that the flattest composite was the second composite fabricated in Example I. Although composites fabricated by the second procedure of Example I were substantially flat, they frequently were found to have a "bow" which was excessive for many applications. This bow became evident to an observer when a straight edge was placed across the densified composite plate. The amount of bowing varies from composite to composite but it is not uncommon to have a gap between the straight edge and the plate of as much as about 0.060 to about 0.150 inches within a 5 inch span.

EXAMPLE III 48 monotapes having dimensions of 5.25×2.5 inches were fabricated by the RF plasma spray process. An additional, 10 fiberless foils having the same dimensions were also fabricated. The monotapes and foils were then assembled into layups for HIP processing. Each layup comprised one fiberless foil at the center with 12 monotapes on each side of the center fiberless foil. Two additional fiberless foils were positioned on each of the two faces of each layup and the assembly was spot welded together to hold the assembly of monotapes and foils in place. Except for the center fiberless foil, the rough side of the monotapes and fiberless foils were facing outward toward the surface of the assembled layups.

Figure 2:
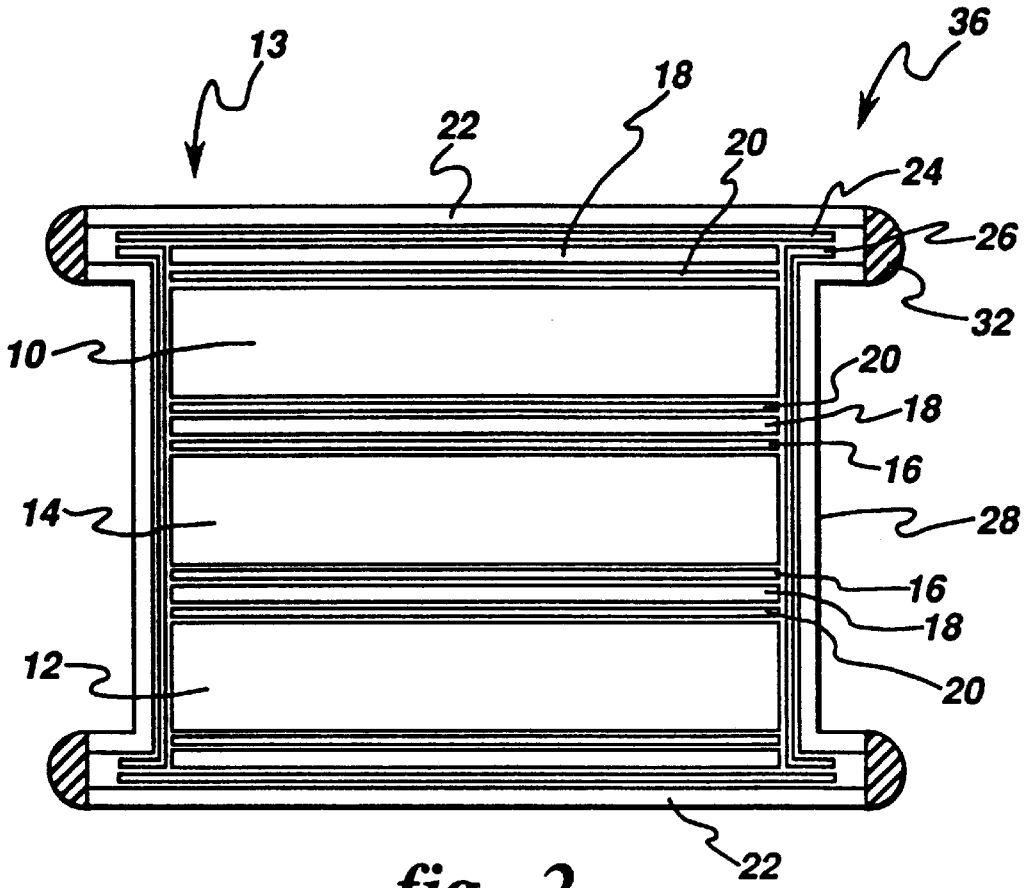

The construction of the HIP can used to hold the two identical layups is shown in the figures. Referring now first to FIG. 2, the two identical composites 10 and 12 are positioned within the HIP can structure 13 on opposite sides of a slab 14 of metal having a high melting point. Such a slab 14 may be, for example, a slab of Ti-6242 (Ti-6Al-2Sn-4Zr-2Mo). The dimensions of the center slab 14, for this example, was 5.25 inches×2.5 inches×1.5 inches thick. This slab 14 was placed in the center of the HIP can 13 to act as a stiffener and prevent bowing during HIPing. On each side of the slab 14, identical stackups were placed, which consisted of about a 0.002 inch thick molybdenum foil 16, about a 0.060 inch thick molybdenum plate 18, about a 0.002 inch thick molybdenum foil 20, the composite 10, about a 0.002 inch thick molybdenum foil 20, and about a 0.060 inch thick molybdenum plate 18. The molybdenum foils 16, 20 the molybdenum plate 18, and the composites 10, 12 had dimensions of about 5.25×about 2.5 inches.

Figure 3:
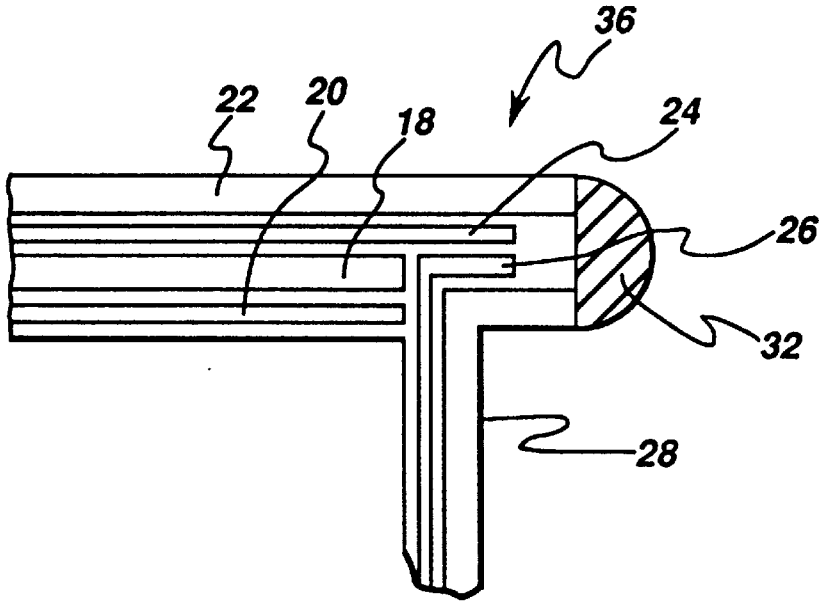

The structure of the HIP can 13 comprised an outer flat wall 22 of about 0.062 inches thick mild steel. The molybdenum foil 24, 26 covering the HIP can surface extended around the bends of the can walls 22, 28 as indicated in FIG. 3.

After assembly, all edges of the HIP can 13 were welded and leak checked. The can was evacuated, sealed, and then HIP'd for three hours at 900° C. and 15 ksi in conventional HIPing apparatus.

Following the HIPing, the HIP can 13 was removed from the HIP apparatus and was opened and disassembled. The flatness of the densified composites was determined by placing a straight edge across their length. Both composites were flat to within about 0.010 inches at a distance of about 0.25 inches from the edges. There was an upward cusp on the surface about 0.25 inches from the edge. It was hypothesized that, the cusp had resulted from the composite densifying from both the side and the face. Further from the edge, the composite densified from the face only thus remaining flat. Metallographic examination confirmed that the fiber layers were distorted near the edges but not at the center. Fiber extraction by dissolution of the matrix alloy in an acid solution revealed that 96% of the fibers were unbroken in the composite.

EXAMPLE IV

To demonstrate that the HIP processing as described with reference to Example III above could be used to make large composite plates, another composite was fabricated. In order to do so, 72 monotapes and 6 fiberless foils were first fabricated by the RF plasma spray process. The monotapes and foil were cut to dimensions of 15.5×4.25×18 inches. Two composite layups were fabricated by placing a fiberless foil in the center and spot welding 18 monotapes on each side of the fiberless foil. In each case, the rough side of the monotapes faced outward. Fiberless foils were spot welded over the faces of the outermost monotapes on each side of the two layups.

The fabrication of the containing HIP can 13 was essentially the same as that described with reference to Example III above and illustrated in the accompanying drawings with a few minor refinements. To encourage densification of the composite through the faces of the can, the thickness of the side walls of the HIP can waes increased from about 0.062 inches to about 0.125 inches. The thickness of the faces of the can remained at about 0.062 inches. The thickness of the titanium base beveled slab in the center of the can was reduced from about 1.5 to about 1.0 inches but its other dimensions were the same as those of the layups and specifically about 15.5 by about 4.25 inches. Two TZM molybdenum plates were cut to dimensions of about 15.5 by about 4.25 by about 0.25 inches. To assure flatness, one side of each plate was ground smooth. The thicker TZM molybdenum plate was substituted for the about 0.060 inch thick molybdenum plate adjacent to the face of the can 13 as set forth in Example III above. During assembly of the components to be HIP'd, it became apparent that the width of the HIP can was about 0.125 inches wider than the composite layup. To fill the free volume of the can, a 0.062 inch thick mild steel plate covered with a double layer of about 0.002 inch thick molybdenum foil was inserted on each side of the composite layup in the HIP can. This extra plate on each side made the effective side wall thickness about 3/16ths of an inch.

The entire assembly as described above was welded in a gettered dry box. The welded assembly was then evacuated and sealed after heating to 400° C. The HIP can and its contents were then heated to 900° C. and 15 ksi of pressure was then applied for the next three hours.

After HIPing, the composites were removed from the HIP can by sawing off the protruding welded wings 36. After cutting the welds, all pieces of the can 13 came apart easily because of the doubled molybdenum foils, 24, 26 in all locations.

Inspection of the two composite plates 10, 12 revealed that they were almost perfectly flat in the length direction. The entire panel was flat to within about 0.020 inches and had a uniform thickness to within about 0.003 inches. The largest deviation from flatness was within about 0.5 inches at the edge. At distances greater than about 0.5 inches from the edge, the panel was flat to within about 0.010 inches. The asymmetric wall thickness of the HIP can completely eliminated the cusp edges that were observed as described in Example III above.

From the foregoing examples, it is evident that a novel method and novel HIPing structure for producing fiber reinforced composite structures with a high degree of flatness is taught. It is also evident that the method using the HIP constraints, as taught above, makes possible the production, by HIPing technology, of flat fiber reinforced composite plates having metal matrices, such as titanium base metals, which are larger than can be produced by hot pressing employing currently commercially available presses.

As mentioned in the above examples, stiffening block 14 is positioned in the middle of the composite with the appropriate structures separating it therefrom on each side of the stiffening block and on each side of the composites 10, 12. One of the keys to achieving the greater flatness involves the relative thickness of the left and right side walls 28 versus the top and bottom walls 22.

As shown in FIGS. 2 and 3, the thickness of the outer side walls 28 as opposed to the top and bottom walls 22 were increased. Specifically, the side walls 8 were two (2) times the thickness of the top and bottom walls 22. This increased thickness provided for greater pressure impacting the composite from the top and bottom as opposed to from the sides, resulting in achieving the relatively flatter composites.

As is known, it is important to avoid weld 32 failure during the HIP process. This is normally accomplished by preventing the welds from going into tension.

Previously, the composites were retrieved from the HIP can by placing the entire HIP can 13 in a container of acid thereby converting the steel into steel nitrate. This method was very costly, especially in disposing of the nitric acid waste. Additionally, this method was quite time consuming. By having the extension or wing 36, a new simple procedure was developed, such as using a band saw to cut through one wing or wings 36 and through the two molybdenum foils 24, 26 that extend into the wings. With the new procedure, the welded end 32 of the wing 36 falls off from the HIP can and the HIP can then just falls apart without having to dissolve the entire can in a nitric acid solution.

Since the molybdenum foil also does not bond to the relatively inexpensive TZM molybdenum stiffener of the top and bottom 22, thus, the molybdenum foil and the TZM molybdenum stiffener debond so that the stiffeners 18 can be reused. In fact, all the expensive critical components including the Ti-64 (Ti-6Al-4V) block, can be reused numerous times because the Ti-64 has a different expansion coefficient than the Ti-6242 composite which has a different expansion coefficient than the molybdenum stiffeners. The difference in expansion coefficient is useful because it helps the stiffeners 18 debond from the composite 10, 12 and themselves when the HIP can is opened by slicing off the welded wing 36.

A second interesting feature incorporated into the HIP can 13 and method of the present invention involves the series of molybdenum foils 24, 26 that debond from the composite when the HIP can 13 is broken at the weld 32. Molybdenum does not HIP bond to itself at 1000° C. and 15,000 psi, the pressure and temperature used in some of the examples. Hence, by having about 1 or 2 mil thick molybdenum foils 16 around the composites 10, 12, the foils bonded to the steel part 22, 28 of the HIP can 13 and to the Ti-6242 metal matrix composite but not to the quarter-inch molybdenum stiffener 18 that have been placed in the HIP can, or the composite makeups, 10, 12.

While the methods, articles and product herein described constitute preferred embodiments of the invention, it is to be understood that the invention is not limited to these precise methods and articles, and that changes may be made therein without departing from the scope of the invention which is defined in the appended claims.

What is claimed is:

1. A hot isostatic press method for forming flat sheet metal matrix composites having a dimension greater than 4×5 inches, the method comprising the steps of:

providing at least one mat having aligned reinforcing fibers;

plasma spraying the at least one mat with a matrix metal to form at least one monotape structure;

providing at least one slab of metal having a high melting point and two flat parallel sides;

disposing at least one monotape structure, on each of the two flat parallel sides to form a generally symmetric assembly;

enclosing the symmetric assembly symmetrically within a HIP can enclosure having a top and a bottom and two side walls;

sealing the HIP can;

evacuating the HIP can enclosure; and subjecting the canned assembly to a hot isostatic press process such that at least one essentially flat metal matrix composite structure is formed.

2. The method of claim 1 further comprising the step of: removing the composites from the can and from the slab of metal.

3. The method of claim 1 wherein the two side walls are thicker than the top and bottom walls.

4. The method of claim 3 wherein the side walls are about twice as thick as the top and bottom walls.

5. The method of claim 1 wherein the formed metal matrix composite structure is flat to within about 0.010 inches at a distance of about 0.25 inches from the edge.

6. The method of claim 1 wherein the formed metal matrix composite structure is flat within about 0.020 inches with the largest deviation being about 0.5 inches at the edge.

7. The method of claim 6 wherein the formed metal matrix composite structure is flat to within about 0.01 inches at distances greater than 0.5 inches from the edge.

* * * * *